(12) United States Patent
Huner

(10) Patent No.: US 10,471,583 B1
(45) Date of Patent: Nov. 12, 2019

(54) HANDLE GRIP AND PROCESS FOR MAKING SAME

(71) Applicant: M.J. Huner LLC, Chicago, IL (US)

(72) Inventor: Mitchell Huner, Chicago, IL (US)

(73) Assignee: M.J. Huner LLC, Chicago, IL (US)

( * ) Notice: Subject to any disclaimer, the term of this patent is extended or adjusted under 35 U.S.C. 154(b) by 0 days.

(21) Appl. No.: 16/516,205

(22) Filed: Jul. 18, 2019

Related U.S. Application Data

(62) Division of application No. 15/986,773, filed on May 22, 2018.

(51) Int. Cl.
| | | |
|---|---|---|
| *B25G 1/10* | (2006.01) | |
| *B29C 70/74* | (2006.01) | |
| *B29C 70/02* | (2006.01) | |
| *B25G 1/01* | (2006.01) | |
| *B29K 105/08* | (2006.01) | |
| *B29L 31/46* | (2006.01) | |

(52) U.S. Cl.
CPC ............ *B25G 1/102* (2013.01); *B25G 1/01* (2013.01); *B29C 70/023* (2013.01); *B29C 70/74* (2013.01); *B29K 2105/0845* (2013.01); *B29L 2031/463* (2013.01)

(58) Field of Classification Search
CPC ..... Y10T 16/466; Y10T 16/476; Y10T 16/48; Y10T 16/498; B25G 1/102; B25G 1/02; B25G 1/01; B25G 1/10; B25G 3/36; B29C 70/023; B29C 70/74; B29C 70/687; B29C 70/688; B29K 2015/0845; B29L 2031/463
See application file for complete search history.

(56) References Cited

U.S. PATENT DOCUMENTS

| | | | | |
|---|---|---|---|---|
| 2,000,295 | A * | 5/1935 | Oldham | A63B 53/14 473/298 |
| 2,200,626 | A * | 5/1940 | Lamkin | A63B 53/14 473/203 |
| 4,012,039 | A * | 3/1977 | Yerke | A63B 49/08 473/568 |
| 5,374,059 | A * | 12/1994 | Huang | A63B 49/08 473/523 |
| 5,657,674 | A * | 8/1997 | Burnett | B25D 1/12 81/20 |
| 6,514,156 | B1 * | 2/2003 | Zorzi | A63B 53/10 473/319 |
| 6,695,713 | B2 * | 2/2004 | Huang | A63B 53/14 473/301 |
| 6,860,821 | B2 * | 3/2005 | Unosawa | A63B 53/10 473/320 |
| 7,374,498 | B2 * | 5/2008 | Huang | A63B 53/14 473/302 |
| 8,389,842 | B2 * | 3/2013 | Alleyne | B25G 1/102 84/422.4 |

(Continued)

*Primary Examiner* — Chuck Y Mah
(74) *Attorney, Agent, or Firm* — AU LLC; Adam E. Urbanczyk

(57) ABSTRACT

A handle grip and process for making such handle grip. The handle grip comprises a cording arranged in a spaced knotted configuration around and along a handle. The spaced knotted cording is first entirely covered with a permeable woven layer. The permeable woven layer is covered with a hardener that permeates the woven layer and secures the woven layer and cording to the handle in water-tight fashion.

9 Claims, 4 Drawing Sheets

(56) References Cited

U.S. PATENT DOCUMENTS

| | | | |
|---|---|---|---|
| 8,627,549 B2* | 1/2014 | Vernieu | B25G 1/102 16/421 |
| 2002/0142858 A1* | 10/2002 | Chen | A63B 53/14 473/301 |
| 2003/0139223 A1* | 7/2003 | Ulrich | A63B 53/14 473/301 |

* cited by examiner

HANDLE GRIP AND PROCESS FOR MAKING SAME

FIELD OF THE INVENTION

This invention generally relates to handles for tools and other implements, particularly those against which significant forces are applied or those which are utilized in dirty, contaminated, or slippery environments.

BACKGROUND OF THE INVENTION

Accessories or treatments for handles which enhance a user's ability to engage them are well known in the art. Generally, a handle "grip" is a device or apparatus that improves the handle user's "grip" onto the handle, that improvement being increased hand purchase and pressure on the handle. Considering most handles, for hand tools or other devices, are substantially cylindrical and made of non-deforming materials (e.g., wood, metal) which do not by default conform to the complex contour of the interior of person's closed hand, users often desire some implement placed onto the handle so that the tool or device is used effectively. Moreover, where a tool is heavy or otherwise requires significant force to operate, or where a tool is typically utilized in dirty or other environments where the friction between the user's hand(s) and the handle is often compromised, a handle grip may be essential for the tool's safe operation. In dirty or contaminated environments, there is a particular need for handle grips to (i) give the tool user's hand(s) maximum purchase on the handle and (ii) resist destruction from the user's use of the tool handle in those environments.

Certain examples in the prior art help illustrate common limitations and weaknesses. U.S. Pat. No. 1,017,565 discloses a Grip or Handle. This reference describes a grip comprised of a flattened rubber tube that is spirally wound around a shaft. The rubber tube flattens as it is kept in spirally-wrapped tension around the shift and forms radially-symmetrical grooves between successive wraps. Not only is the disclosed grip not designed to conform to the asymmetry of a human hand's purchase on a shaft, but it is not designed to resist any significant force or to be utilized in any excessively dirty or contaminated environment.

U.S. Pat. No. 5,267,487 discloses a Vibration Handle Grip and Process for Making Same. This reference discloses a grip comprising a vibration damping polyurethane elastomer surrounding a handle. The vibration damping elastomer is overlaid with a tack-free elastomer coating-impregnated tubular sleeve. The reference does not disclose any feature(s) improving hand purchase on a provided handle; rather, the elastomeric firmaments and coatings are designed to attenuate vibration generated from the tool as experienced by the user's hand(s). The reference in fact acknowledges that vibration damping function exhibited does not lend itself to supporting heavy use, as the materials necessary for vibration damping are generally less durable.

U.S. Pat. No. 5,343,776 discloses a Handle Grip Cover and Process for Making Same. The grip disclosed is formed by placing a tubular material over a non-stick (shaft) surface, impregnating the tubular material with an elastomer, curing the material, and then removing the cured grip from the non-stick surface to be re-applied to a desire handle after being trimmed to a desired length. The reference does not disclose any sub-structure which might conform to hand anthropometrics, and the reference does not disclose any treatment of the grip which might render it durable beyond the physical characteristics of the tubular material.

U.S. Pat. No. 5,511,445 discloses a Flexible Hand Grip for Handles. The grip disclosed comprises a foam layer sandwiched between a rubber layer and fabric layer, the laminated combination being wrapped around a handle and securing against itself with hook-and-loop edges. The reference does not disclose any structure within the layers which might help a user's hand gain purchase on the grip, and this the enshrouded handle, not does it disclose any hardening process or feature which is wear-resistant.

U.S. Pat. No. 5,797,813 discloses a Handle Grip. The grip disclosed is a strip of polyurethane bonded to a strip of felt, the strips having edges that, when the grip is spirally wound around a handle, form a water-retarding joint to protect the adhesive which binds the grip to the handle (e.g., golf club). The polyurethane layer and felt layer have closed and open pores, respectively, which enable the grip to slightly deform to hand pressure. However, the reference does not disclose any substructure against which a user's hand may create additional purchase nor does the reference disclose any hardening or wear-resistant feature, the intended use for the grip being for golf clubs and tennis racquets.

U.S. Pat. No. D426,450 discloses a Handle Grip. The grip appears to be, essentially, two series of ridges on either side of an Allen wrench-type multi tool. While the ridges do appear to allow for a user's fingers to more-securely grip what might otherwise be flat surfaces on the sides of the tool, no hardening or wear-resistance is disclosed. Moreover, the ridges do not appear to be oriented in such a way as to maximize the purchase of a human's fingers around the tool given the typical size of hex wrench key.

A review of the prior art reveals that existing handle grip technology is not designed in any fashion comprehensive of hand purchase and durability considerations. Indeed, the cited references remark on how, generally, grip durability treatments are difficult to apply and expensive. While no handle grip will be indestructible under all conditions, an object to any such article is to be as durable as possible while maximizing grip performance.

Generally, the present invention's innovations, as the Detailed Description will elaborate, address the shortcomings of the prior art without sacrificing the configuration requirements necessary to ensure the invention's near-universal handle compatibility.

BRIEF SUMMARY OF THE INVENTION

The present invention is a handle grip comprising a sequence of spaced nodular cording along the handle's length. A woven layer covers the spaced cording and exposed handle. A hardener is applied to and permeates the woven layer, securing the cording and woven layer together and against the handle in water-tight fashion.

BRIEF DESCRIPTION OF THE FIGURES

The accompanying figures and drawings, incorporated into and forming part of the specification, service to further illustrate the present invention, its various principles and advantages, and its varying embodiments.

DETAILED DESCRIPTION

Figure 1:
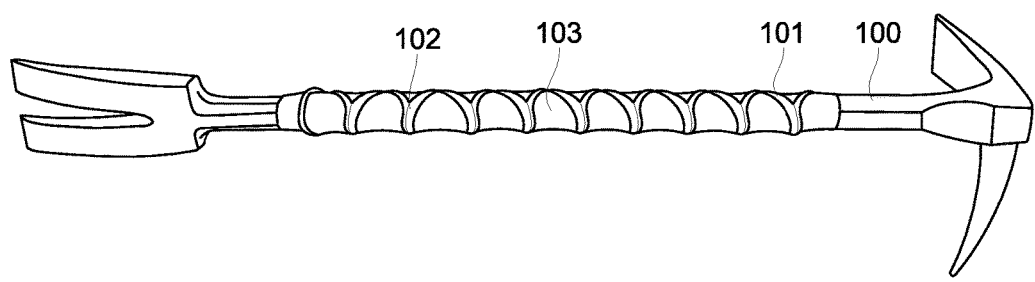
FIG. 1 illustrates an exemplary handle grip applied to the handle of a Halligan bar.

Provided is a handle grip. The handle grip first comprises a cord (alternatively, "cording") wrapped around the handle to which the grip is to be applied. The cord is configured around the handle in a series of knots tied against the handle whereby spaces are created between the knots. FIG. 1 illustrates an exemplary application of the handle grip. A handle with substantial radial symmetry 100 is provided. Cording 101 is wrapped around the handle 100, with knots 102 tied along the length of the handle. The knots 102 are arranged to create spaces 103. Alternatively, knots may be eschewed where the cording is sufficiently thick such that hand purchase is improved without the cording build-up created by the knot creation.

Figure 2:
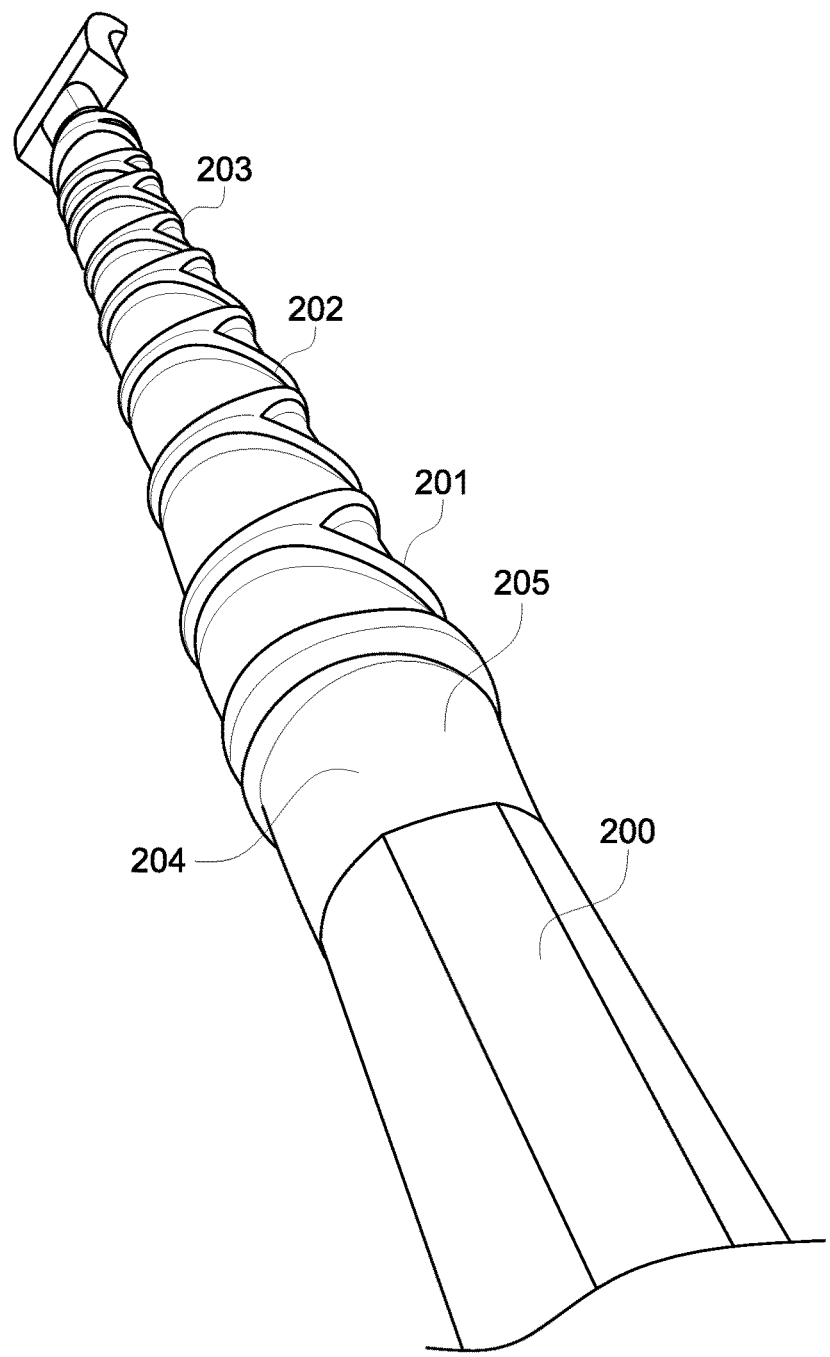
FIG. 2 illustrates a close-up view of an exemplary handle grip applied to the handle of a Halligan bar.

FIG. 2 provides a close-up view of the exemplary handle grip configuration in FIG. 1. A handle with substantially-radial symmetry 200 is provided. Cording 201 is wrapped around the handle 200 along its length. A series of knots 202 are tied along the handle length, creating spaces 203. A woven layer 204 is applied on top of the cording 201 along a length of the handle 200 inclusive of the handle covered by the cording. A hardener 205 is applied to and permeates the woven layer 204, sealing the woven layer and enshrouded cording 201 and knots 202 from moisture.

Figure 3:
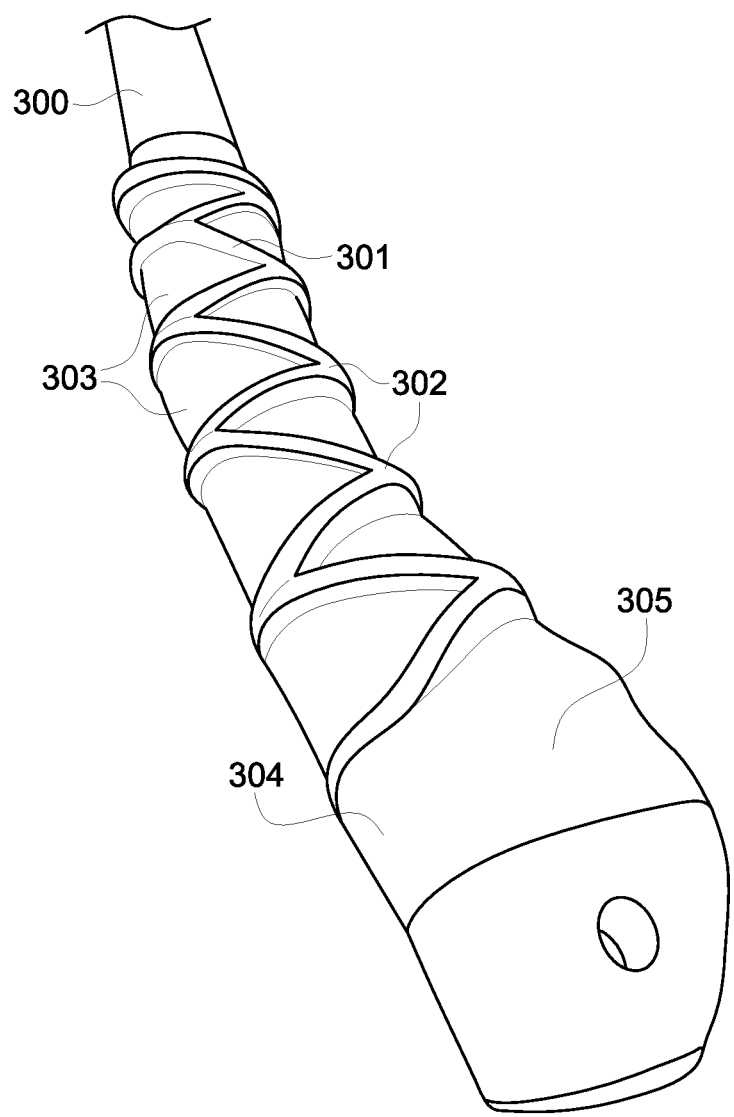
FIG. 3 illustrates a close-up view of an exemplary handle grip applied to the handle of an axe.

FIG. 3 illustrates another exemplary handle grip configuration. A handle with radial asymmetry 300, in this case a fire axe handle, is provided. Cording 301 is wrapped along a useable length of the handle, tied into a series of knots 302. Spaces 303 are created between the knots. A woven layer 304 is wrapped along a length of the handle inclusive of and over that which is covered by the cording 301. A hardener 305 is applied to the woven layer.

Figure 4:
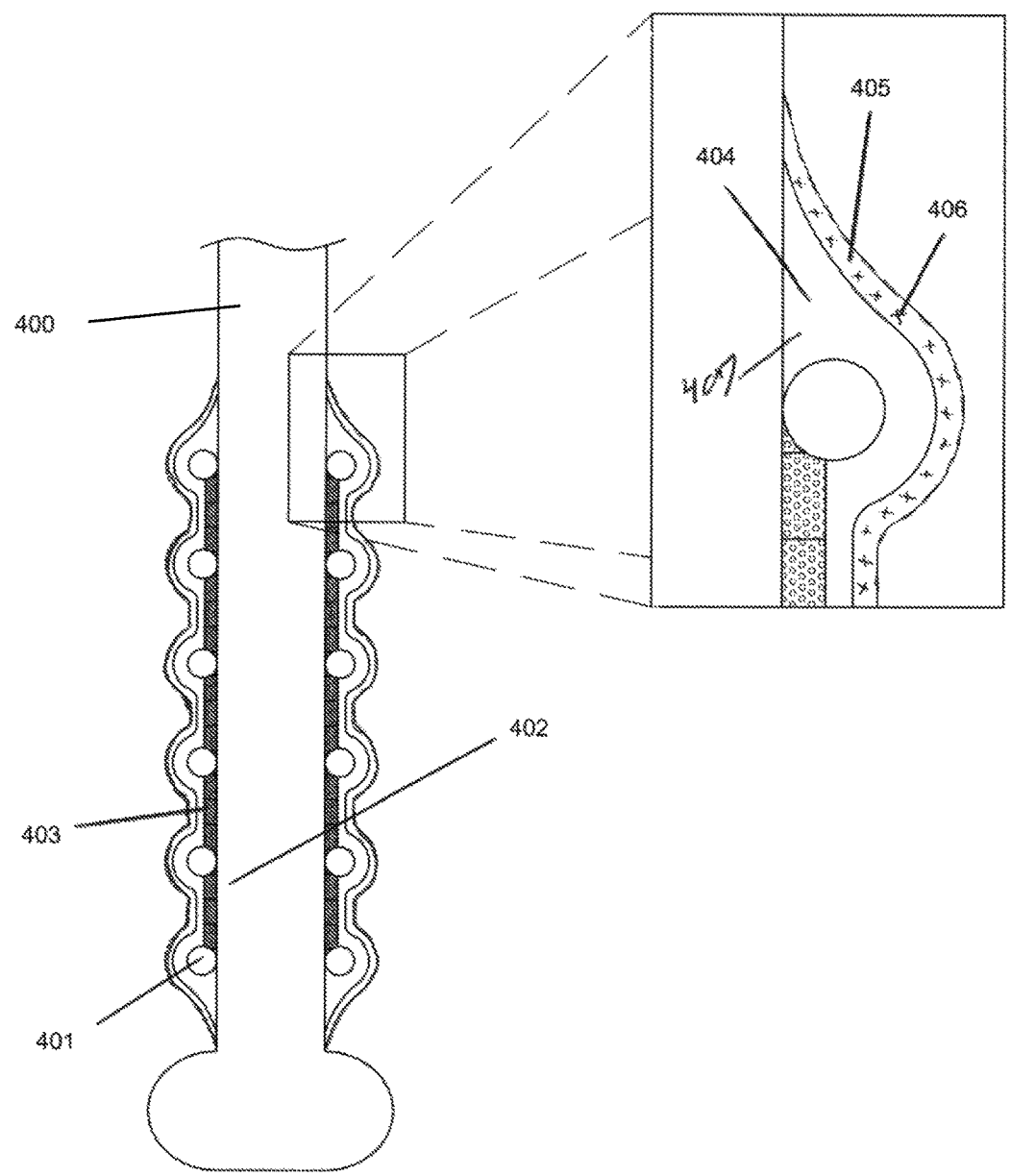
FIG. 4 illustrates a cross-sectional view of an exemplary handle grip applied to the handle of a baseball bat.

FIG. 4 illustrates another exemplary handle grip configuration. A handle 400, in this case, a baseball bat, is provided. A plurality of thick cording rings 401 circumscribe the handle 400 along its length to create a plurality of spaces 402. A plurality of shock absorbing layers 403 are disposed on the spaces circumscribing the handle 400. A woven layer 404 containing an adhesive 407 is wrapped along the length of the handle 400 sufficient to cover the plurality of cording rings 401, spaces 402, and shock absorbing layers 403. A hardener 405 is applied to permeate the woven layer 404 to harden and affix the woven layer 404 over the plurality of cording rings 401, spaces 402, and shock absorbing layers 403 and against the handle 400. Particulate material 406 exists within the hardener coating 405 to improve friction between the user's hand or glove and the handle grip.

The cording can be made from rope, twine, high gauge metal wire, paracord, nylon, polymer braid, or similar materials or tubing made therefrom which, which configured into a rope-like line, have substantial thickness. The knots may be west county whipping knots, variations thereof, or other knots which create a tactile ridge above the surface of the handle and allow the handle grip applier to space the knots apart. Knot spacing is variable, although spacing between 1" and 1.5" to allow for human fingers, which may be gloved, to rest in the spaces which gripping the handle is optimal.

The woven layer may be cloth, polymer fabric, fiberglass, metal mesh, or other flexible materials, in tape or sheet configuration which are permeable. The woven layer may incorporate a separate adhesive with which the woven layer can adhere to the handle surface.

The hardener is, generally, a liquid emulsion containing acrylic, vinyl, or polymer components, which may include anti-slip particulate added as desired to improve friction between the handle grip surface and the user's hand. The anti-slip particulate may be silica, polymeric, acrylic, carbide, corundum, and other durable particulate matter readily-integrated into the hardener matrix. The hardener is water-impermeable to prevent degradation of the underlying elements (e.g., the woven layer).

The shock absorbing layer may be a rubber-type material such as nitrile or vinyl, neoprene foam, or other flexible material which acts to attenuate shock and vibration between the handle and the user's hands.

While the handle grip invention has been described with reference to certain embodiments, various modifications thereof will be apparent to those skilled in the art without departing from the scope of the invention.

I claim:

1. A method of making a handle grip, comprising the steps of:
   providing a handle;
   circumscribing the handle at least twice with at least two lengths of cording to create at least one space;
   applying a woven layer around the at least two lengths of cording; and
   applying a liquid hardener to the woven layer.

2. The method of claim 1, further comprising the step of tying at least two knots with the at least two lengths of cording along a length of the handle.

3. The method of claim 2, wherein the at least two knots are west county whipping knots.

4. The method of claim 1, further comprising the step of disposing a shock absorbing layer onto the handle within the at least one space.

5. The method of claim 1, further comprising the step of applying an adhesive layer to the woven layer.

6. The method of claim 1, wherein the woven layer is made from a material selected from the group consisting of cloth, polymer fabric, fiberglass, and metal mesh.

7. The method of claim 1, further comprising the step of applying anti-slip particles onto the liquid hardener.

8. The method of claim 1, wherein the liquid hardener contains anti-slip particles.

9. The method of claim 1, wherein the at least two lengths of cording are rubber rings.

* * * * *